UNITED STATES PATENT OFFICE.

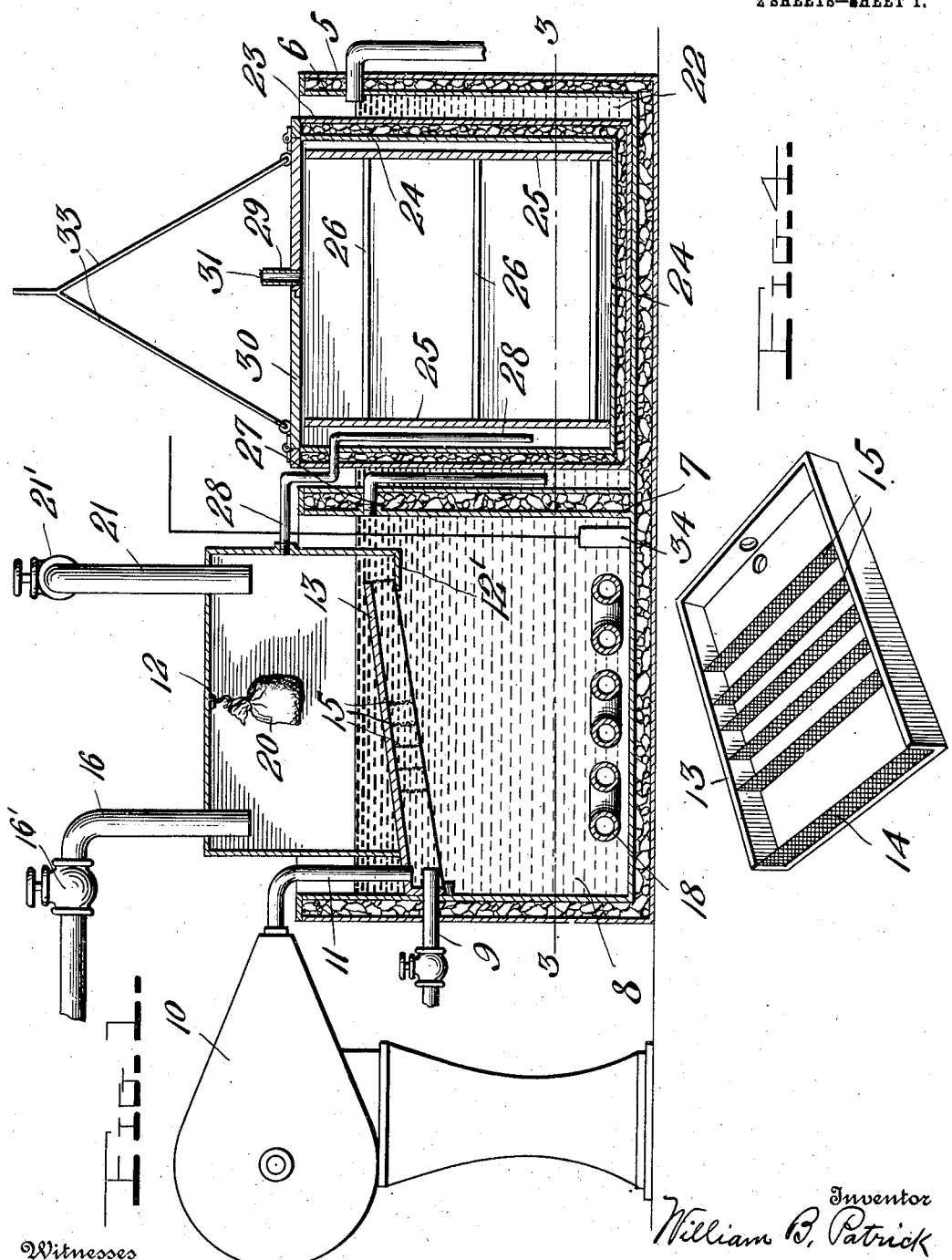

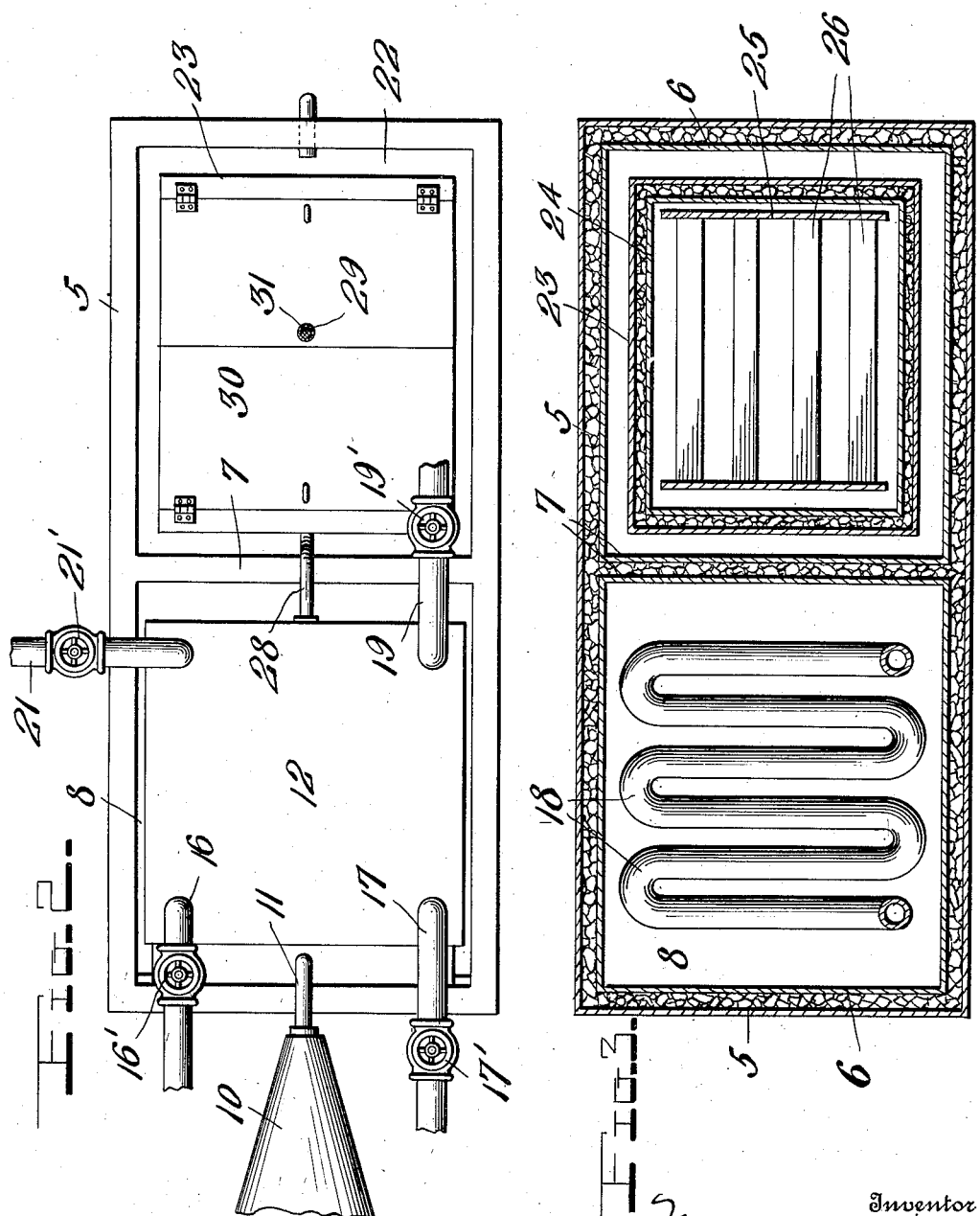

WILLIAM BENNIE PATRICK, OF WOODLAND, CALIFORNIA.

AIR PURIFYING AND DISTRIBUTING APPARATUS.

956,159.          Specification of Letters Patent.      Patented Apr. 26, 1910.

Application filed November 10, 1909. Serial No. 527,315.

*To all whom it may concern:*

Be it known that I, WILLIAM BENNIE PATRICK, a citizen of the United States, residing at Woodland, in the county of Yolo and State of California, have invented certain new and useful Improvements in Air Purifying and Distributing Apparatus, of which the following is a specification, reference being had to the accompanying drawings.

This invention relates to certain new and useful improvements in air purifying and distributing apparatus which is adapted more particularly for ventilating the rooms of a dwelling, office, public building or the like, whereby a constant supply of fresh air may be had, the process of purification killing and removing all germs from the air currents.

Another object of the invention is to provide a refrigerator in connection with the air supply chamber, pipes extending from said chamber into the refrigerator and adapted to maintain a constant circulation of fresh air through the same.

A further object is to provide a blower adapted to discharge air into a water tank, a suitable screen or straining device being located in said tank through which the air currents are adapted to pass from the water into the air supply tank, said tank having removably located therein a salt bag so that the air becomes surcharged with salt before it is carried therefrom and utilized.

With these and other objects in view, the invention consists of the novel features of construction and the combination and arrangement of parts hereinafter fully described and claimed, and illustrated in the accompanying drawings, in which—

Figure 1 is a vertical longitudinal section of an apparatus embodying my invention; Fig. 2 is a top plan view; Fig. 3 is a horizontal section on the line 3—3 of Fig. 1; and Fig. 4 is a detail perspective view of the straining sieve.

Referring to the drawings, 5 indicates a substantially rectangular tank which is formed with the hollow walls 6. Charcoal or other non-conducting material is disposed in the hollow walls of the tank. The tank is preferably formed to provide two compartments, and is divided by a central transverse hollow wall 7. This wall has open communication with the side walls of the chamber and also receives the non-conducting material. The chamber 8 is adapted to receive a supply of water from the supply pipe 9, and a fan or blower 10 of any preferred form is also adapted to discharge air into the water through the pipe 11 which extends therefrom. Supported within the upper end of the tank is a housing 12. The greater part of the bottom of this housing is cut away to receive a strainer or sieve 13. This strainer is angularly disposed and through one end and the top thereof the water and air supply pipes 9 and 11, respectively, extend. As shown in detail in Fig. 4, this strainer comprises a top, side walls, and one end wall, the outer end and the bottom of said sieve being open. A transverse wire mesh 14 extends between the sides of the strainer at its outer end, and a plurality of similar straining members 15 are arranged in spaced relation between the ends of the strainer. The other end of the member 13 is supported upon the short bottom wall 12' of the housing 12.

A pipe 16 extends through the top of the housing and is adapted to carry off the supply of air which is discharged into the same from the water after passing through the various straining members carried by the sieve. This air is conducted to a chamber which would preferably be located out-doors to receive the rays of the sun, or, if desired, may be heated by artificial means. During the passage of the air through the pipe 16, it becomes thoroughly dry and is returned through the pipe 17 to the apparatus. The pipe 17 extends downwardly into the tank or chamber 8 and is coiled, as shown at 18, transversely therein. The air becomes cooled during its passage through this convoluted portion of the pipe which is disposed in the base of the tank and subjected to the cooling action of the water. The supply of air from and to the apparatus is controlled by the valves 16' and 17', respectively. After passing through the coil 18, the pipe is vertically extended through the top of the housing and then laterally turned, as shown at 19. A valve 19' is interposed in this portion of the pipe and is adapted to regulate the supply of the purified air which flows through the pipe and is conducted to the various apartments of the residence, school, hospital, or other public building. In Fig. 1 I have shown a salt bag 20 removably disposed within the housing 12. The air in ascending into the housing contacts with this bag and absorbs the salt properties thereof, thus producing salt air. The degree of salt contained in the air may be regulated by the size of the bag. When it is desired to carry the air directly off from the housing 12 to the rooms of the building without its passing through the drying pipe 16, the valve 16' is cut off and the air will then be exhausted from the housing through the pipe 21 in which a valve 21' is located. This pipe is connected at any convenient point to the pipe 19 from which the air is distributed.

In the other of the chambers 22 of the tank 5 a refrigerator or provision box 23 is adapted to be arranged. This refrigerator is also formed with hollow walls 24 similar to the walls of the water tank. Vertical plates 25 are secured within the refrigerator between which the shelves 26 are arranged, and receive thereon the various provisions. Extending through the central transverse wall 7 of the water tank there is a pipe 27 which conveys water from the tank 8 into the chamber 22. This water entirely surrounds the refrigerator which is placed therein and keeps the contents cool and fresh. A pipe 28 also extends from the housing 12 and is adapted to conduct the air therefrom to the interior of the refrigerator. This air is kept in constant circulation and is exhausted through the short pipe 29 secured in one of the hinged cover sections 30. The upper end of this pipe has secured thereto a wire mesh 31 which prevents the entrance of flies or other insects to the interior of the provision chamber. A cord 33 is secured in eyes on the top of the refrigerator by means of which the same may be lifted from the chamber 22 (after disconnecting the pipe 28 from the housing 12) when it is desired to scour the same. In this manner, the contents of the refrigerator may be preserved for an indefinite time, and a constant supply of pure fresh air is carried into the various dwelling rooms.

From the foregoing it will be seen that I have produced an air purifying and distributing apparatus of comparatively simple construction. It is adapted to be installed in the basement of the building and is admirably adapted for use in such institutions as hospitals, sanatoriums, and large office buildings. It will also be found a great convenience and benefit for private use. The various elements employed in its construction are of simple form and compactly arranged so that the entire apparatus will occupy but little space.

While I have shown and described what I believe to be the preferred embodiment of the invention, it will be understood that various minor modifications may be resorted to without departing from the essential features or sacrificing any of the advantages of the invention.

If desired, an electrode 34 may be positioned in the main water tank 8 whereby the water may be charged to destroy the germs entering therein through the air pipe 11. This electrode may be wired in any desired manner to a suitable source of electromotive force.

Having thus described the invention what is claimed is:

1. In an apparatus of the character described, the combination of a tank having hollow walls, air and water pipes extending into said tank, said air pipe being adapted to discharge the air below the level of the water, a housing arranged in said tank extending below the water level, an air conducting member arranged in said tank extending at an angle through the bottom of the housing, transverse straining members carried by said air conductor through which the air passes and is exhausted into the housing, and conducting pipes communicating with said housing, one of said pipes extending into the tank and formed with a coil adjacent to the bottom thereof, said pipe then extending upwardly through the opposite side of the housing, substantially as and for the purpose set forth.

2. In an apparatus of the character described, the combination of a tank having hollow walls, a housing extending into said tank, the greater portion of the bottom of said housing being open, an air conducting member disposed at an angle and supported at one end on the remaining bottom portion of the housing, a water supply pipe extending through the wall of said tank and through the opposite end of the conducting member, a fan having a pipe connected thereto and extending into the top of said member adjacent to the water pipe, said pipe being adapted to discharge the air from the fan below the water level, a conducting pipe extending from one corner of said housing adapted to carry the air therefrom, said pipe extending through said housing and into the tank, the latter pipe having a coil formed therein adjacent to the bottom of the tank and then extended upwardly through the opposite side of the tank, a salt bag removably carried in said housing and a second conducting pipe communicating with the interior of the housing, substantially as and for the purpose set forth.

3. In an apparatus of the character described, the combination of a tank, a water supply pipe extending into said tank, a housing supported in said tank above and below the water level, means for discharging air into the water below the surface, an air conducting member arranged within said housing disposed below the water level and extending through the bottom of the housing adapted to discharge the air into said housing, means for directly conducting the air from the housing to be utilized, and means for conducting the air from said housing and returning the air current to the tank to be again passed through the body of water before it is utilized, substantially as and for the purpose set forth.

4. In an apparatus of the character described, the combination of a tank having a water supply pipe extending into said tank, a housing supported in the tank adapted to extend below the water level, a fan arranged adjacent to the tank and having a discharge pipe communicating therewith extending into the tank, an air conducting member arranged in the tank extending upwardly and through the bottom of the housing, the air being discharged beneath said conducting member, a plurality of reticulated straining members carried by said conducting member adapted to strain the air in its passage through the water before discharging the same into the housing, a salt bag removably arranged in the housing, a conducting pipe adapted to convey the air from the housing to be utilized, a second conducting pipe communicating with said housing adapted to convey the air therefrom, said pipe being returned upon itself and again extended through the housing and into the body of water whereby the air may be cooled, the pipe finally extending through the top of the housing, the direct conducting pipe having connection therewith, substantially as and for the purpose set forth.

5. In an apparatus of the character described, the combination of a tank, a water supply pipe extending into said tank, a fan arranged adjacent to the tank, a pipe extending from said fan through the tank to discharge the air below the water level, an air conducting member arranged in the tank carrying a plurality of straining members through which the air passes, means for conducting the air from said tank to be utilized, means for returning the air to the tank through suitable pipes to pass the same through the body of water to cool the air, and an electrode arranged upon the bottom of the tank having electrical connection with a suitable supply of electromotive force, substantially as and for the purpose set forth.

In testimony whereof I hereunto affix my signature in the presence of two witnesses.

WILLIAM BENNIE PATRICK.

Witnesses:
J. R. MITCHELL,
W. A. ANDERSON.